United States Patent
Chung

(10) Patent No.: US 7,031,094 B2
(45) Date of Patent: Apr. 18, 2006

(54) APPARATUS AND METHOD FOR DETECTING AND COMPENSATING FOR RESONANCE FREQUENCY IN DATA STORAGE SYSTEM

(75) Inventor: Da-woon Chung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/972,562

(22) Filed: Oct. 26, 2004

(65) Prior Publication Data

US 2005/0111125 A1 May 26, 2005

(30) Foreign Application Priority Data

Nov. 10, 2003 (KR) ............... 10-2003-0079169

(51) Int. Cl.
*G11B 21/02* (2006.01)

(52) U.S. Cl. ..................... 360/75; 360/69

(58) Field of Classification Search ............ 360/69, 360/75
See application file for complete search history.

(56) References Cited

U.S. PATENT DOCUMENTS

| | | | | |
|---|---|---|---|---|
| 5,325,247 A | * | 6/1994 | Ehrlich et al. ......... | 360/78.09 |
| 6,574,065 B1 | * | 6/2003 | Sri-Jayantha et al. ...... | 360/75 |
| 6,643,080 B1 | * | 11/2003 | Goodner et al. .......... | 360/31 |
| 6,687,065 B1 | * | 2/2004 | Tan et al. ............. | 360/31 |
| 2001/0036027 A1 | | 11/2001 | Min et al. | |
| 2002/0041472 A1 | | 4/2002 | Ding et al. | |

FOREIGN PATENT DOCUMENTS

| | | |
|---|---|---|
| JP | 2003-085905 | 3/2003 |
| KR | 000047652 A | 7/2000 |

* cited by examiner

*Primary Examiner*—David Hudspeth
*Assistant Examiner*—Jason Olson
(74) *Attorney, Agent, or Firm*—Staas & Halsey LLP

(57) ABSTRACT

A method and an apparatus detect and compensate for a mechanical resonance frequency occurring in a system. The apparatus includes an excitation unit that increases a gain of a predetermined frequency band of a driving signal, a resonance frequency detector frequency-transforming a response signal, and detecting the resonance frequency in a frequency domain, an excitation signal generator separately generating a first excitation signal and a second excitation signal, a mixer mixing one of the first excitation signal or the second excitation signal with a driving signal that does not pass through the excitation unit, and inputting a result of the combination to the system, a resonance determination unit determining whether resonance occurs in the system, and a system controller determining a frequency of one of the first excitation signal or the second excitation signal input when resonance occurs in the system, as the resonance frequency.

30 Claims, 4 Drawing Sheets

APPARATUS AND METHOD FOR DETECTING AND COMPENSATING FOR RESONANCE FREQUENCY IN DATA STORAGE SYSTEM

CROSS-REFERENCE TO RELATED APPLICATIONS

This application claims the priority of Korean Patent Application No. 2003-79169, filed on Nov. 10, 2003, in the Korean Intellectual Property Office, the disclosure of which is incorporated herein in its entirety by reference.

BACKGROUND OF THE INVENTION

1. Field of the Invention

The present invention relates to an apparatus and a method to determine and compensate for a mechanical resonance frequency in a data storage system, and more particularly, to an apparatus and a method for rapidly and precisely determining, adaptively filtering, and compensating for a mechanical resonance frequency in a data storage system.

2. Description of the Related Art

In general, a Hard Disk Drive (HDD) is a data storage system that consists of a Head Disk Assembly (HDA) configured with mechanical components and electrical circuits. A resonance generated by a Head Stack Assembly (HSA) constituting the HDA appears directly in a position error signal (PES) and prevents a servo-tracking control from being stably performed in the HDD.

In this connection, Korean Patent Laid-open Publication No. 2000-047652 and U.S. Patent Application Publication No. 2002-041472 suggest techniques of detecting and compensating for a resonance frequency occurring in a data storage system. In detail, Korean Patent Laid-open Publication No. 2000-047652 discloses a technique of filtering a resonance frequency, wherein a frequency in a PES obtained using servo information stored in a data storage medium is converted using a Fast Fourier Transformation (FFT), a PES-frequency transformed sample is obtained using a predetermined Goertzel's algorithm, a resonance frequency is calculated using a velocity associated with the particular sample having a maximum magnitude, and the resonance frequency is filtered using a programming filter.

U.S. Patent Application Publication No. 2002-041472 discloses a technique of determining a resonance frequency by detecting a movement of an actuator arm, collecting a data point from a PES regarding the movement, and performing a digital Fourier transformation on the data point.

However, the above prior art techniques allow a resonance frequency to be detected by performing a frequency transformation using a transformation such as the FFT, thus detecting only resonance frequencies within a Nyquist frequency band. That is, it is impossible to detect latent resonance frequencies within a sampling frequency band outside the Nyquist frequency band.

SUMMARY OF THE INVENTION

The present invention provides an apparatus and a method for detecting latent resonance frequencies within a sampling frequency band in a data storage system, rapidly sorting out and removing only a resonance frequency from the detected resonance frequencies that may deteriorate the performance of the data storage system, and an apparatus and a method of compensating for the resonance frequency using the same.

According to one aspect of the present invention, an apparatus detects a resonance frequency in a system, the apparatus including an excitation unit exciting the system by increasing a gain of a predetermined frequency band of a driving signal input to the system; a resonance frequency detector frequency-transforming a response signal generated by the system in response to the driving signal input from the excitation unit, and detecting the resonance frequency in a frequency domain; an excitation signal generator separately generating a first excitation signal with the resonance frequency detected by the resonance frequency detector, and a second excitation signal with a frequency obtained by subtracting the resonance frequency from a sampling frequency selected for frequency transformation; a mixer mixing one of the first excitation signal or the second excitation signal with a driving signal that does not pass through the excitation unit, and inputting a result of combination to the system; a resonance determination unit determining whether resonance occurs in the system using a response signal generated by the system in response to a signal output from the mixer; and a system controller determining a frequency of one of the first excitation signal or the second excitation signal input when resonance occurs in the system, as the resonance frequency.

According to another aspect of the present invention, an apparatus detects a resonance frequency in a disk drive, the apparatus including an excitation unit exciting a head stack assembly by increasing a gain of a predetermined frequency band of a driving signal input to a voice coil motor actuator; a resonance frequency detector frequency-transforming a response signal generated by the voice coil motor actuator in response to the driving signal input from the excitation unit and detecting the resonance frequency in a frequency domain; an excitation signal generator separately generating a first excitation signal with the resonance frequency detected by the resonance frequency detector, and a second excitation signal with a frequency obtained by subtracting the resonance frequency from a sampling frequency selected for frequency transformation; a mixer combining one of the first excitation signal or the second excitation signal with a driving signal that does not pass through the excitation unit, and inputting a result of combination to the voice coil motor actuator; a resonance determination unit determining whether resonance occurs in the system using a response signal generated by the voice coil motor actuator in response to a signal output from the mixer; and a system controller determining a frequency of one of the first excitation signal and the second excitation signal input when resonance occurs in the system, as the resonance frequency.

According to yet another aspect of the present invention, an apparatus compensates for a resonance frequency in a disk drive, the apparatus including a voice coil actuator moving a transducer in response to an actuator driving signal and generating a servo control signal; a servo controller generating a servo-driving signal for controlling the voice coil motor, using the servo control signal; a switching unit receiving the servo-driving signal and switching the servo-driving signal to be output to one of a mixer, a boosting filter, or a notch filter in response to a switching control signal; the boosting filter increasing a gain of an output of the switching unit within a predetermined frequency band; the notch filter filtering a resonance frequency component from the output of the switching unit; the mixer mixing an output of one of the switching unit, the boosting filter, or the notch filter, and one of a first excitation signal or a second excitation signal generated by an excitation unit under a predetermined condition, and generating a result of mixture as an actuator driving signal; a resonance frequency detector frequency-transforming a response signal output from the voice coil motor actuator in a first period in which the output of the boosting filter is input from the mixer, and detecting a resonance frequency in a frequency domain; a frequency operation unit subtracting the resonance frequency detected by the resonance frequency detector from a sampling frequency selected for frequency transformation by the resonance frequency detector; the excitation signal generator separately generating the first excitation signal with the resonance frequency detected by the resonance frequency detector, and the second excitation signal with a frequency that is a result of subtraction performed by the frequency operation unit; a resonance determination unit determining whether resonance occurs in the response signal generated by the voice coil motor actuator, in a second period in which one of the first excitation signal or the second excitation signal is generated by the excitation signal generator; a system controller generating the switching control signal for controlling a switching operation of the switching unit according to a predetermined switching sequence, and determining a frequency of one of the first excitation signal or the second excitation signal input when resonance occurs, as the resonance frequency; and a notch filter coefficient generator determining coefficients of the notch filter such that the notch filter removes a frequency component with the resonance frequency determined by the system controller.

According to still another aspect of the present invention, a method detects a resonance frequency in a system, the method including boosting on a predetermined frequency band of a driving signal input to the system; frequency-transforming a response signal output from the system and detecting a resonance frequency in a frequency domain; separately generating a first excitation signal with the resonance frequency detected, and a second excitation signal with a frequency obtained by subtracting the resonance frequency detected from a sampling frequency for frequency transformation; boosting of the predetermined frequency band of the driving signal input to the system, mixing the driving signal and one of the first excitation signal or the second excitation signal, and inputting a result of mixture to the system; determining whether resonance occurs in a response signal generated by the system in response to one of the first excitation signal or the second excitation signal; and determining a frequency of one of the first excitation signal or the second excitation signal input when resonance occurs, as the resonance frequency.

According to still another aspect of the present invention, a method detects a resonance frequency in a disk drive, the method including boosting on a predetermined frequency band of a driving signal input to a voice coil motor actuator so as to excite a head stack assembly; frequency-transforming a response signal output from the voice coil motor actuator and detecting a resonance frequency in a frequency domain; separately generating a first excitation signal with the resonance frequency detected, and a second excitation signal with a frequency obtained by subtracting the resonance frequency detected from a sampling frequency for frequency transformation; boosting of the predetermined frequency band of the driving signal input to the voice coil motor actuator, combining the driving signal and one of the first excitation signal or the second excitation signal, and inputting a result of combination to the voice coil motor actuator; determining whether resonance occurs in a response signal generated by the voice coil motor actuator in response to one of the first excitation signal or the second excitation signal; and determining a frequency of one of the first excitation signal or the second excitation signal input when resonance occurs, as the resonance frequency.

According to another aspect of the present invention, a method compensates for a resonance frequency in a disk drive, the method including boosting on a predetermined frequency band of a driving signal input to a voice coil motor actuator so as to excite a head stack assembly; frequency-transforming a response signal output from the voice coil motor actuator and detecting a resonance frequency in a frequency domain; separately generating a first excitation signal with the resonance frequency detected, and a second excitation signal with a frequency obtained by subtracting the resonance frequency detected from a sampling frequency for frequency transformation; boosting of the predetermined frequency band of the driving signal input to the voice coil motor actuator, mixing the driving signal and one of the first excitation signal or the second excitation signal, and inputting a result of mixture to the voice coil motor actuator; determining whether resonance occurs in a response signal generated by the voice coil motor actuator in response to one of the first excitation signal or the second excitation signal; determining a frequency of one of the first excitation signal or the second excitation signal input when resonance occurs, as the resonance frequency; and determining coefficients of a filter that filters the driving signal so as to remove a frequency component with the resonance frequency determined.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
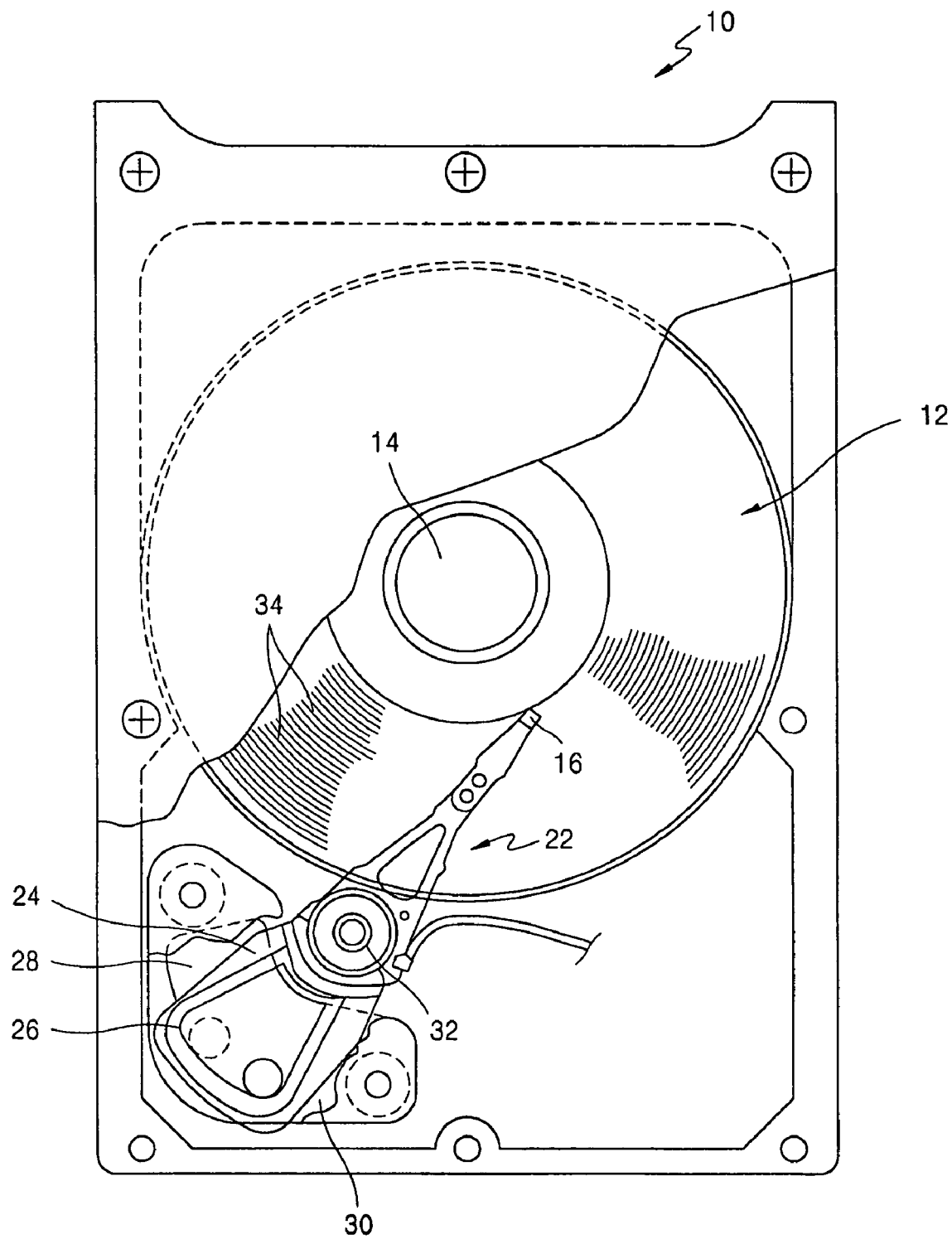
FIG. 1 is a top view of a Hard Disk Drive (HDD) according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a top view of a Hard Disk Drive (HDD) 10 according to an embodiment of the present invention. The HDD 10 includes at least one magnetic disk 12 that is rotated by a spindle motor 14, and a transducer (not shown) that is located adjacent to a surface of a disk 12.

The transducer writes information to and reads information from the rotating disk 12 by magnetizing the disk 12 and sensing a magnetic field of the disk 12, respectively. In general, a transducer is installed adjacent to a surface of a disk. Although the transducer is shown and described as a single transducer in this disclosure for convenience, it is understood that the HDD includes a write transducer that magnetizes the disk 12 and a separate read transducer that senses the magnetic field of the disk 12. The read transducer may be made of a magneto-resistive (MR) material.

The transducer may be integrated into a head 16. The head 16 is constructed to generate an air bearing between the transducer and the surface of the disk 12. The head 16 is integrated into a Head Stack Assembly (HSA) 22. The HSA 22 is attached to an actuator arm 24 with a voice coil 26. The voice coil 26 is located adjacent to a magnet assembly 28 to define a voice coil motor (VCM) 30. Application of a current to the voice coil 26 generates a torque for rotating the actuator arm 24 with respect to a bearing assembly 32. Rotation of the actuator arm 24 moves the transducer across the surface of the disk 12.

Information is stored within annular tracks of the disk 12. Each track 34 includes a plurality of sectors. Each sector includes a data field and an identification field. The identification field may contain a gray code that allows identification of sectors and tracks (cylinders). The transducer is moved across the surface of the disk 12 to write information to or read the information from a track.

In general, a HDD includes a Head Disk Assembly (HDA) having mechanical components, and electrical circuits. A resonance frequency generated by the HSA 22 in the componence of the HDA appears directly in a position error signal (PES) and prevents a servo tracking control from being stably performed in the HDD. Hereinafter, an apparatus and a method to detect and filter, precisely and rapidly, such a resonance frequency so as to solve this problem, according to the present invention, will be described in detail.

Figure 2:
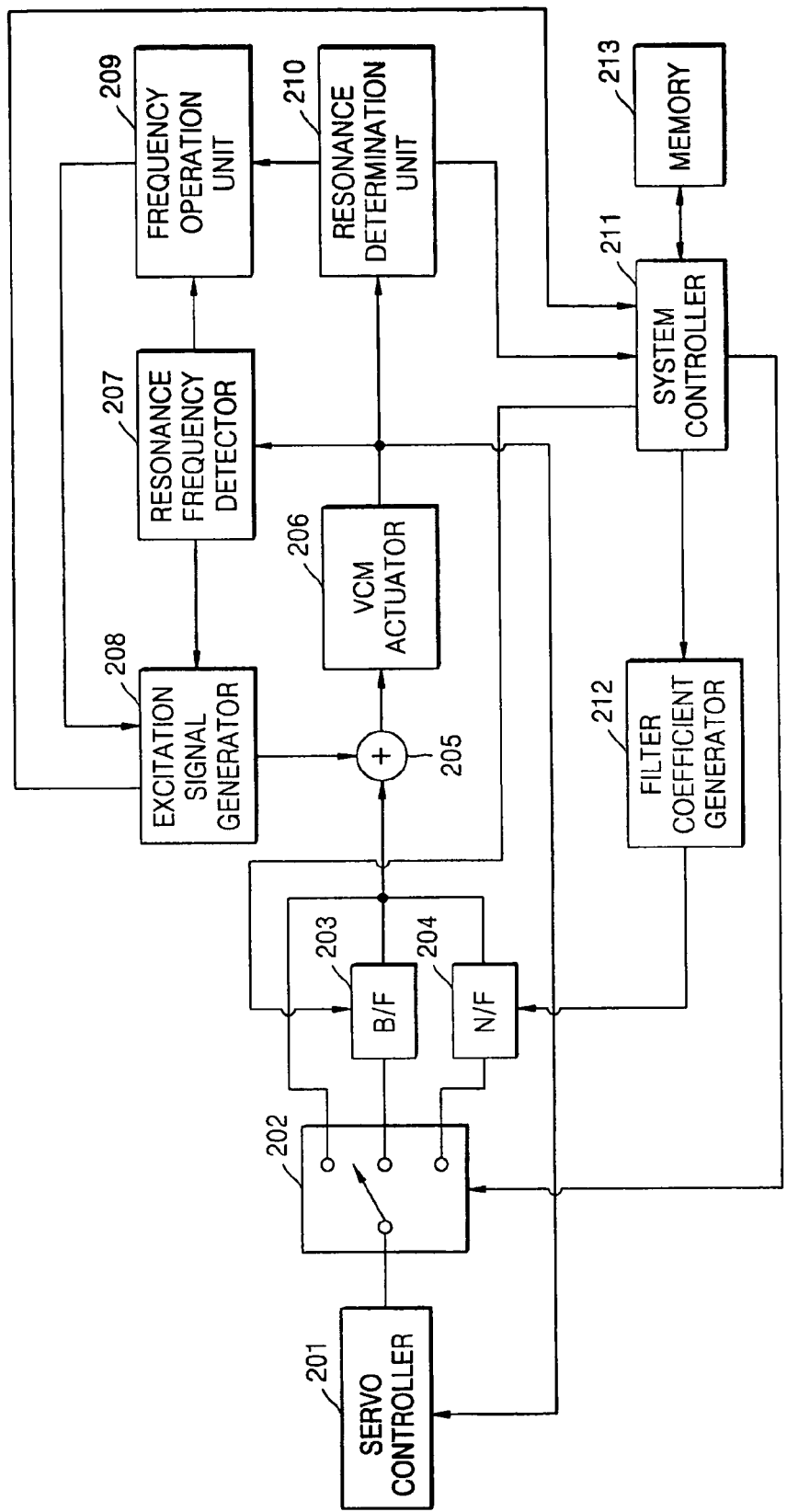
FIG. 2 is a block diagram of an apparatus to detect and compensate for a resonance frequency in a data storage system, according to an embodiment of the present invention.

Referring to FIG. 2, an apparatus to detect and compensate for a resonance frequency in a data storage system, according to an embodiment of the present invention, includes a servo controller 201, a switching unit 202, a boosting filter 203, a notch filter 204, a mixer 205, a VCM actuator 206, a resonance frequency detector 207, an excitation signal generator 208, a frequency operation unit 209, a resonance determination unit 210, a system controller 211, a filter coefficient generator 212, and a memory 213.

When a PES, a servo control signal, generated by the VCM actuator 206, is input to the servo controller 201, the servo controller 201 generates a servo-driving signal to control a voice coil motor to locate a transducer on a center of a target track.

The servo-driving signal is input to an input terminal of the switching unit 202 and switched to be selectively output to one of the mixer 205, the boosting filter 203, or the notch filter 204, in response to a switching control signal generated by the system controller 211.

In a first period of a process of detecting a resonance frequency, the switching control signal is generated such that the servo-driving signal input to the input terminal of the switching unit 202 is switched and output to the boosting filter 203.

The boosting filter 203 may be configured such that the servo-driving signal is boosted on either every frequency band, or only a frequency band that may influence the HDD. In this embodiment, the boosting filter 203 is manufactured such that the servo-driving signal is boosted on a high-frequency band of 1 KHz or more.

A transfer function $D_c(z)$ of the boosting filter 203, according to the present invention, may be designed to satisfy the following equation:

$$D_c(z) = \frac{1 + K_c}{a + K_c Z^{-1}}, \quad (1)$$

wherein $K_c$ denotes a gain constant.

Figure 4:
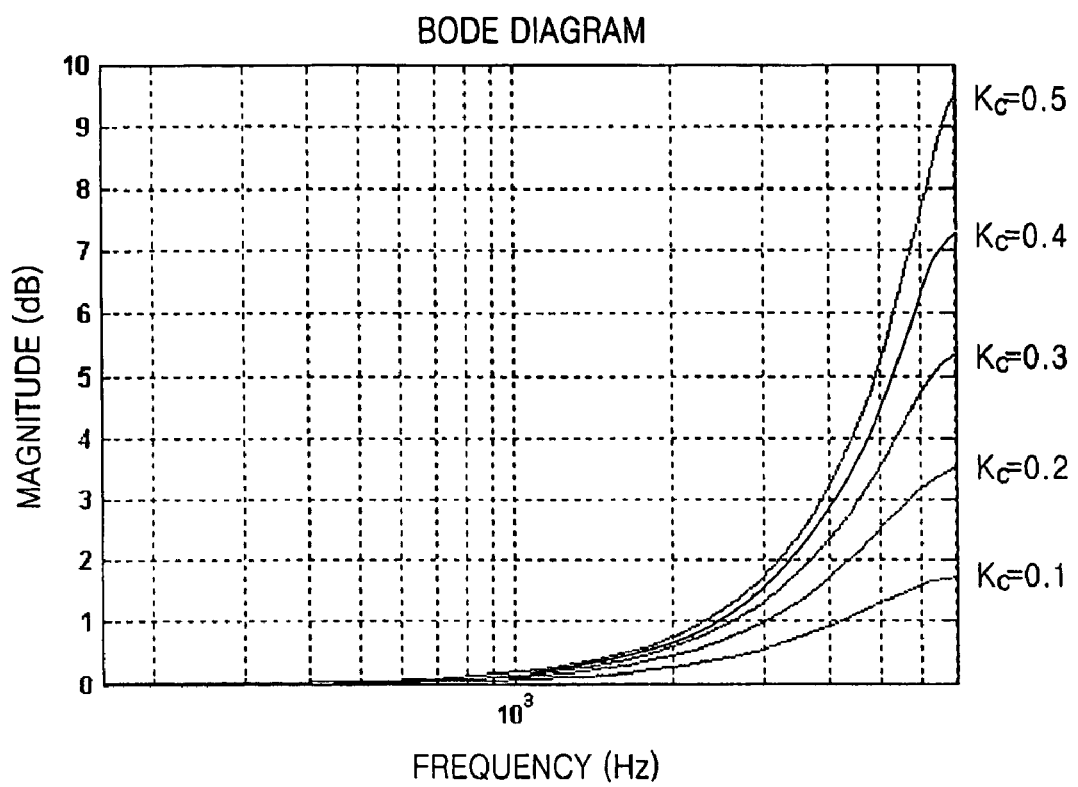
FIG. 4 is a graph illustrating a Bode plot of a boosting filter according to an embodiment of the present invention.

A Bode plot obtained using Equation (1) is illustrated in FIG. 4. Referring to FIG. 4, a gain is increased by the gain constant $K_c$ at a frequency band of 1 KHz or more.

The servo-driving signal is boosted by the boosting filter 203, passes through the mixer 205, and is then applied to the VCM actuator 206. Then, the VCM actuator 206 applies the boosted, mixed servo-driving signal to the VCM, and the boosted, mixed servo-driving signal is resonated at the boosted frequency band. Resonance of the boosted servo-driving signal is reflected in a PES generated by the VCM actuator 206.

Next, the resonance frequency detector 207 performs frequency transformation of the PES using a frequency transformation such as a frequency Fourier transformation (FFT), and detects a resonance frequency in a frequency domain.

After detecting the resonance frequency, it must be determined if the resonance frequency is a band component within a Nyquist frequency band, or a band component that is aliased at a frequency band outside the Nyquist frequency band.

For this, the frequency operation unit 209 subtracts the resonance frequency detected by the resonance frequency detector 207 from a sampling frequency selected for frequency transformation, and outputs information regarding a frequency obtained as a result of subtraction to the excitation signal generator 208. Then, the first period ends, and a second period starts.

In the second period, the excitation signal generator 208 sequentially generates a first excitation signal with the resonance frequency detected by the resonance frequency detector 207 and a second excitation signal with the frequency obtained by the frequency operation unit 209.

In the second period, a switching control signal is generated to allow the servo-driving signal input to the input terminal of the switching unit 202 to be output to the mixer 205. Accordingly, the servo-driving signal is not boosted in the second period.

More specifically, the excitation signal generator 208 first generates the first excitation signal and outputs it to the mixer 205. Next, the first excitation signal is mixed with the servo-driving signal whose frequency is not boosted by the mixer 205, and a result of combination is applied to the VCM actuator 206. Thus, resonance caused by the first excitation signal may be reflected in the PES generated by the VCM actuator 206.

Next, the resonance determination unit 210 analyzes a magnitude of the PES in a time domain and determines whether a resonance occurs in the PES. When it is determined that the resonance occurs, the system controller 211 determines the frequency of the first excitation signal as a resonance frequency and stores information regarding the frequency of the first excitation signal in the memory 213.

Similarly, the second excitation signal generated by the excitation signal generator 208 is applied to the VCM actuator 206 to determine whether a resonance occurs in this signal. When it is determined that the resonance occurs, the system controller 211 determines the frequency of the second excitation signal as a resonance frequency and stores information regarding the frequency in the memory 213. Then, the second process ends.

After the determination of the resonance frequencies, the system controller 211 reads the information regarding the resonance frequencies from the memory 213 and outputs the read information to the filter coefficient generator 212.

Next, the filter coefficient generator 212 determines filter coefficients of the notch filter 204 such that the notch filter 204 filters frequency components corresponding to the information. Then, the notch filter 204 is updated with the filter coefficients determined by the filter coefficient generator 212.

After the first and second periods, a switching control signal is generated to allow the servo-driving signal, which is input to the input terminal of the switching unit 202, to be switched to be output to the notch filter 204. Accordingly, latent resonance frequency components in the HDD may be completely filtered by the notch filter 204.

Figure 5:
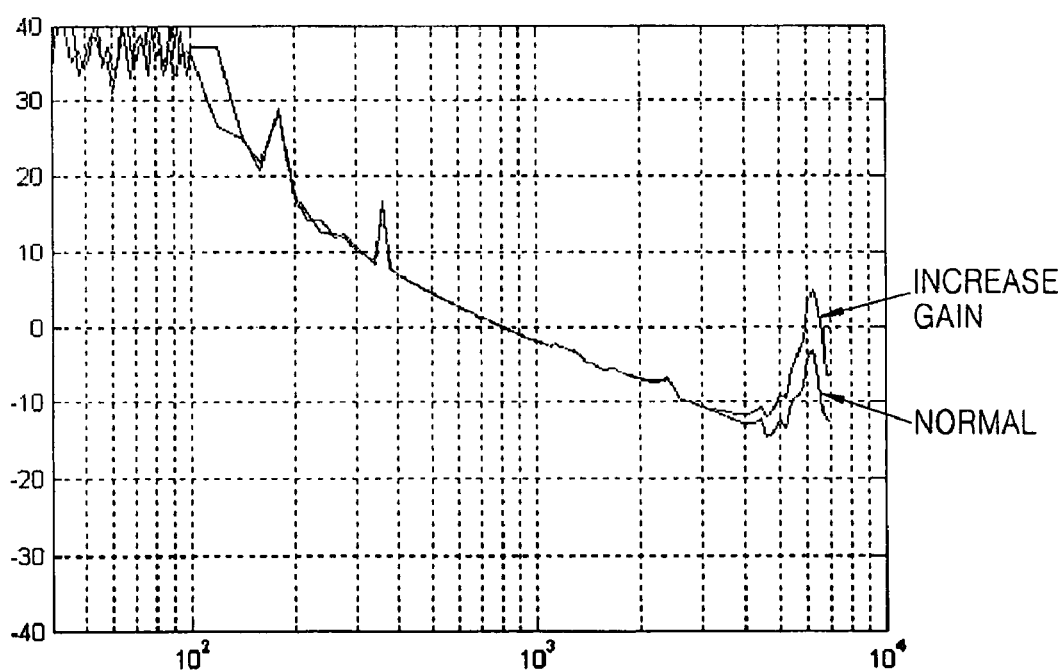
FIG. 5 is a graph illustrating frequency characteristics improved by using a boosting filter, according to an embodiment of the present invention.

In the first period, the boosting filter 203 is used to excite the HDD. Thus, when the PES is used, a margin of a resonance frequency within a high-frequency band is reduced, allowing detection of latent resonance frequency components that are difficult to detect. FIG. 5 illustrates an effect obtained by using a boosting filter according to an embodiment of the present invention.

The method of detecting resonance frequencies according to the present invention may be performed during manufacture of a HDD. Also, the method may be accomplished under conditions set by a user, if necessary.

Figure 3:
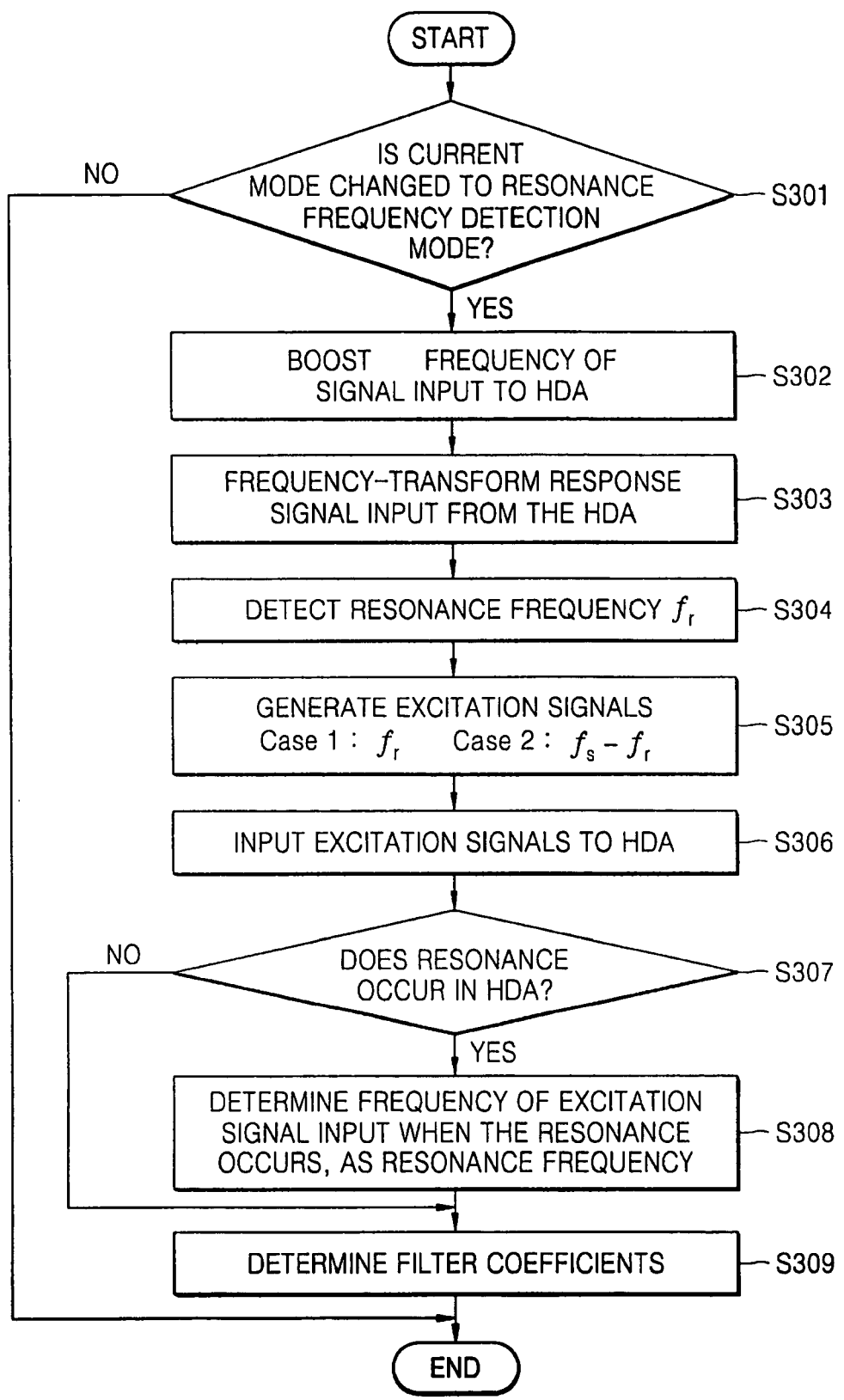
FIG. 3 is a flowchart illustrating a method of detecting and compensating for a resonance frequency in a data storage system, according to an embodiment of the present invention.

FIG. 3 is a flowchart illustrating a method of detecting and compensating for a resonance frequency in a data storage system, according to an embodiment of the present invention. Referring to FIG. 3, the system controller 211 of FIG. 2 determines whether a current mode is changed to a resonance frequency detection mode in response to a command from a host computer (not shown) (S301).

If it is determined in S301 that the current mode is changed to the resonance frequency detection mode, a signal input to a HDA is boosted (S302). In detail, a servo-driving signal input to the VCM actuator 206 of the HDA is boosted on a high-frequency band using the boosting filter 203.

Next, a response signal input from the HDA, which is oscillated by the boosted servo-driving signal, is frequency-converted (S303). That is, when the boosted servo-driving signal is input to the VCM actuator 206, a PES is generated by the VCM actuator 206, and then a frequency transformation algorithm such as FFT is applied to the PES.

Next, a resonance frequency $f_r$ is detected from the PES in a frequency domain (S304).

Next, a first excitation signal with the resonance frequency $f_r$, and a second excitation signal with a frequency obtained by subtracting the resonance frequency $f_r$ from a sampling frequency $f_s$ for frequency transformation are sequentially generated, to determine whether the resonance frequency $f_r$ is a band component within a Nyquist frequency band or a band component that is aliased at a frequency band outside the Nyquist frequency band (S305).

Thereafter, the first and second excitation signals are separately applied to the VCM actuator 206 of the HDA (S306). In this case, the servo-driving signal input to the HDA is boosted and mixed with the first or second excitation signal, and then, a result of mixture is input to the VCM actuator 206.

Next, a magnitude of the PES generated by the VCM actuator 206 is checked to determine whether a resonance occurs in this signal (S307).

When it is determined in S307 that the resonance occurs, a frequency of one of the first excitation signal or the second excitation signal input when the resonance occurs is determined as a resonance frequency (S308).

Next, filter coefficients of the notch filter 204 are determined such that the notch filter 220 filters the signal input to the HDA to remove the resonance frequency determined in S308 (S309).

When it is determined in S307 that the resonance does not occur, the filter coefficients are determined in S309.

As described above, according to the present invention, a resonance frequency in a HDD is detected by exciting a system at frequencies in a frequency band where a resonance may occur in a HDD, and determining whether the detected resonance frequency is a frequency component within a Nyquist frequency band or a band component that is aliased at a frequency band outside the Nyquist frequency band. Thus, the present invention removes a need of exciting the system while increasing a frequency, thus reducing a time required for determination of a resonance frequency. Also, it is possible to precisely detect a resonance frequency at a frequency band outside the Nyquist frequency band. Further, the present invention allows a filter to be optimally designed to sort out only a resonance frequency that deteriorates the performance of the system from other resonance frequencies.

The present invention may be realized as a method, an apparatus, a system, and the like. When the present invention is implemented as software, the members of the present invention are code segments that execute necessary operations. Programs or code segments may be stored in a processor readable medium or may be transmitted by a transmission medium or by a computer data signal combined with a carrier in a communication network. The processor readable medium may be any medium, such as an electronic circuit, a semiconductor memory device, a ROM, a flash memory, an erasable ROM, a floppy disc, an optical disc, a hard disc, an optical fiber medium, or a radio frequency (RF) network, which can store or transmit information. The computer data signal may be any signal that can be transmitted through a transmission medium such as an electronic network channel, an optical fiber, air, an electromagnetic field, or an RF network.

The invention may further be described as a resonance frequency minimizing system, comprising: a controller; an input signal adaptation unit, coupled to receive control signals from the controller; and a resonance compensating unit, coupled to receive, separately, an unboosted signal, a boosted signal and a notch-filtered signal from the input signal adaptation unit and to detect and compensate for a mechanical resonance frequency in the system.

Generally, the input signal adaptation unit comprises: a servo controller to input a drive signal; a switch-filter combination, coupled to the servo controller, to output, selectably, an unboosted signal, a boosted signal or a notch-filtered signal in accordance with a first control signal from the controller; and a filter coefficient generator, to determine notch filter coefficients in accordance with a second control signal from the controller.

The resonance compensating unit generally comprises: an excitation signal generator, to generate and send, separately, to a mixer, a first excitation signal in a first period based on a resonance frequency detected by a resonance frequency detector and a second excitation signal in a second, non-overlapping period based on a subtraction frequency signal; the mixer, coupled to receive one of: an unboosted signal, to be mixed separately with a first excitation signal or a second excitation signal to form a first output and a second output to a voice coil motor actuator; a boosted signal, to be mixed separately with a first excitation signal and a second excitation signal to form a third output and a fourth output to the voice coil motor actuator; or a notch-filtered signal, wherein, when resonance occurs, the input signal adaptation unit filters the drive signal to remove resonance frequency; the voice coil motor actuator, to generate a positive error signal; a resonance determination unit to analyze a magnitude of the positive error signal in a time domain and determine whether a resonance occurs in the positive error signal; the resonance frequency detector, coupled to receive the positive error signal, to perform frequency transformation of the positive error signal and to detect a resonance frequency in a frequency domain; and a frequency operation unit, coupled to the resonance determination unit and the resonance frequency detector, to subtract the resonance frequency detected from a predetermined sampling frequency to output the subtraction frequency signal.

The controller typically comprises: a system controller, coupled to the excitation signal generator, the resonance determination unit and the input signal adaptation unit, to: boost a drive signal in the input signal adaptation unit; store and read resonant frequency information for first excitation signal and the second excitation signal and output the read information to the input signal adaptation unit; and selectably control the input signal adaptation unit to output one of the unboosted signal, the boosted signal, or the notch-filtered signal; and a memory coupled to the system controller. In one embodiment, the boost of the drive signal includes utilizing a boosting filter having a transfer function that is expressed as $$D_c(z) = \frac{1 + K_c}{a + K_c Z^{-1}},$$

wherein $D_c(Z)$ and $K_c$ denote a transfer function and a gain constant, respectively.

The present invention may also be embodied in computer-readable medium containing computer-readable instructions of a resonance frequency minimizing method for performing: implementing a control program that provides control instructions to an input signal adaptation program and a resonance compensating program and that determines whether resonance occurs in the system; controlling the input signal adaptation program to selectively output an unboosted signal, a boosted signal and a notch-filtered signal; and controlling a resonance compensating program that, when resonance occurs, provides information to the input signal adaptation program to facilitate generation of notch filter coefficients to remove a mechanical resonance.

Generally, the input signal adaptation program comprises computer-readable instructions to: input a drive signal; output, selectably, an unboosted signal, a boosted signal, and a notch-filtered signal in accordance with a first control signal; and determine notch filter coefficients in accordance with a second control signal.

Typically, the resonance compensating program comprises computer-readable instructions to: generate separately, a first excitation signal in a first period based on a resonance frequency detected by a resonance frequency detector and a second excitation signal in a second, non-overlapping period based on a subtraction frequency signal; mix, separately: an unboosted signal, with a first excitation signal and a second excitation signal to form a first output and a second output; a boosted signal, with a first excitation signal and a second excitation signal to form a third output and a fourth output; generate a notch-filtered signal, wherein, when resonance occurs, the input signal adaptation program filters the drive signal to remove resonance frequency; generate a positive error signal; analyze a magnitude of the positive error signal in a time domain and determine whether a resonance occurs in the positive error signal; perform frequency transformation of the positive error signal and detect a resonance frequency in a frequency domain; and subtract the resonance frequency detected from a predetermined sampling frequency to output the subtraction frequency signal.

Typically, the control instructions to the input signal adaptation program and the resonance compensating program comprise computer-readable instructions to: control boosting the drive signal in the input signal adaptation program; and store and read resonant frequency information for first excitation signal and the second excitation signal and output the read information to the input signal adaptation program. In one embodiment, the boosting the drive signal includes utilizing a boosting filter having a transfer function that is expressed as $$D_c(z) = \frac{1 + K_c}{a + K_c Z^{-1}},$$

wherein $D_c(Z)$ and $K_c$ denote a transfer function and a gain constant, respectively.

Thus, the present invention may be embodied in a program code, which may be read by a computer, on a computer readable (recording) medium. The computer readable medium includes all kinds of recording apparatuses on which computer readable data are stored. The computer readable media include storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable media may be transmitted to computer systems connected through a network, and the computer-readable instructions may be stored and executed as a computer readable code in a distributed mode.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to detect a resonance frequency in a system, comprising:
an excitation unit exciting the system by increasing a gain of a predetermined frequency band of a driving signal input to the system;

a resonance frequency detector frequency-transforming a response signal generated by the system in response to the driving signal input from the excitation unit, and detecting a resonance frequency in a predetermined frequency domain;

an excitation signal generator separately generating a first excitation signal with the resonance frequency detected by the resonance frequency detector, and a second excitation signal with a frequency obtained by subtracting the resonance frequency from a sampling frequency selected for frequency transformation;

a mixer mixing one of the first excitation signal or the second excitation signal with a driving signal that does not pass through the excitation unit, and inputting a result of combination to the system;

a resonance determination unit determining whether resonance occurs in the system using a response signal generated by the system in response to a signal output from the mixer; and a system controller determining a frequency of one of the first excitation signal or the second excitation signal input when resonance occurs in the system, as the resonance frequency.

2. The apparatus of claim 1, wherein the excitation unit comprises a boosting filter.

3. The apparatus of claim 2, wherein a transfer function of the boosting filter is expressed as $$D_c(z) = \frac{1+K_c}{a+K_c Z^{-1}},$$

wherein $D_c(Z)$ and $K_c$ denote a transfer function and a gain constant, respectively.

4. An apparatus to detect a resonance frequency in a disk drive, comprising:

an excitation unit exciting a head stack assembly by increasing a gain of a predetermined frequency band of a driving signal input to a voice coil motor actuator;

a resonance frequency detector frequency-transforming a response signal generated by the voice coil motor actuator in response to the driving signal input from the excitation unit and detecting the resonance frequency in a predetermined frequency domain;

an excitation signal generator separately generating a first excitation signal with the resonance frequency detected by the resonance frequency detector, and a second excitation signal with a frequency obtained by subtracting the resonance frequency from a sampling frequency selected for frequency transformation;

a mixer combining one of the first excitation signal or the second excitation signal with a driving signal that does not pass through the excitation unit, and inputting a result of combination to the voice coil motor actuator;

a resonance determination unit determining whether resonance occurs in the system using a response signal generated by the voice coil motor actuator in response to a signal output from the mixer; and a system controller determining a frequency of one of the first excitation signal or the second excitation signal input when resonance occurs in the system, as the resonance frequency.

5. The apparatus of claim 4, wherein the excitation unit comprises a boosting filter.

6. The apparatus of claim 5, wherein a transfer function of the boosting filter is expressed with $$D_c(z) = \frac{1+K_c}{a+K_c Z^{-1}},$$

wherein $D_c(Z)$ and $K_c$ denote a transfer function and a gain constant, respectively.

7. The apparatus of claim 4, wherein the response signal generated by the voice coil motor actuator comprises a position error signal.

8. An apparatus to compensate for a resonance frequency in a disk drive, comprising:

a voice coil actuator moving a transducer in response to an actuator driving signal and generating a servo control signal;

a servo controller generating a servo-driving signal to control the voice coil motor, using the servo control signal;

a switching unit receiving the servo-driving signal and switching the servo-driving signal to be output to one of a mixer, a boosting filter, or a notch filter in response to a switching control signal;

the boosting filter increasing a gain of an output of the switching unit within a predetermined frequency band;

the notch filter filtering a resonance frequency component from the output of the switching unit;

the mixer mixing an output of one of the group consisting of the switching unit, the boosting filter, and the notch filter, and one of a first excitation signal or a second excitation signal generated by an excitation unit under a predetermined condition, and generating a result of mixture as an actuator driving signal;

a resonance frequency detector frequency-transforming a response signal output from the voice coil motor actuator in a first period in which the output of the boosting filter is input from the mixer, and detecting a resonance frequency in a predetermined frequency domain;

a frequency operation unit subtracting the resonance frequency detected by the resonance frequency detector from a sampling frequency selected for frequency transformation by the resonance frequency detector;

the excitation signal generator separately generating the first excitation signal with the resonance frequency detected by the resonance frequency detector, and the second excitation signal with a frequency that is a result of subtraction performed by the frequency operation unit;

a resonance determination unit determining whether resonance occurs in the response signal generated by the voice coil motor actuator, in a second period in which one of the first excitation signal or the second excitation signal is generated by the excitation signal generator;

a system controller generating the switching control signal to control a switching operation of the switching unit according to a predetermined switching sequence, and determining a frequency of one of the first excitation signal or the second excitation signal input when resonance occurs, as the resonance frequency; and a notch filter coefficient generator determining coefficients of the notch filter such that the notch filter removes a frequency component with the resonance frequency determined by the system controller.

9. The apparatus of claim 8, wherein the switching control signal is generated such that a signal input to the switching unit is output to the mixer in the second period.

10. The apparatus of claim 8, wherein the switching control signal is generated such that signals input to the switching unit are output to the notch filter in other periods excluding the first and second periods.

11. The apparatus of claim 8, wherein a transfer function of the boosting filter is expressed as $$D_c(z) = \frac{1+K_c}{a+K_cZ^{-1}},$$

wherein $D_c(Z)$ and $K_c$ denote a transfer function and a gain constant, respectively.

12. The apparatus of claim 8, wherein the response signal generated by the voice coil motor actuator comprises a position error signal.

13. A method of detecting a resonance frequency in a system, comprising:
boosting on a predetermined frequency band of a driving signal input to the system;
frequency-transforming a response signal output from the system and detecting a resonance frequency in a predetermined frequency domain;
separately generating a first excitation signal with the resonance frequency detected, and a second excitation signal with a frequency obtained by subtracting the resonance frequency detected from a sampling frequency for frequency transformation;
boosting of the predetermined frequency band of the driving signal input to the system, mixing the driving signal and one of the first excitation signal or the second excitation signal, and inputting a result of mixture to the system;
determining whether resonance occurs in a response signal generated by the system in response to one of the first excitation signal or the second excitation signal; and
determining a frequency of one of the first excitation signal or the second excitation signal input when resonance occurs, as the resonance frequency.

14. The method of claim 13, wherein the boosting is performed by a boosting filter, and
a transfer function of the boosting filter is expressed as $$D_c(z) = \frac{1+K_c}{a+K_cZ^{-1}},$$

wherein $D_c(Z)$ and $K_c$ denote a transfer function and a gain constant, respectively.

15. A method of detecting a resonance frequency in a disk drive, comprising:
boosting on a predetermined frequency band of a driving signal input to a voice coil motor actuator to excite a head stack assembly;
frequency-transforming a response signal output from the voice coil motor actuator and detecting a resonance frequency in a frequency domain;
separately generating a first excitation signal with the resonance frequency detected, and a second excitation signal with a frequency obtained by subtracting the resonance frequency detected from a sampling frequency for frequency transformation;
boosting of the predetermined frequency band of the driving signal input to the voice coil motor actuator, combining the driving signal and one of the first excitation signal or the second excitation signal, and inputting a result of combination to the voice coil motor actuator;
determining whether resonance occurs in a response signal generated by the voice coil motor actuator in response to one of the first excitation signal or the second excitation signal; and
determining a frequency of one of the first excitation signal or the second excitation signal input when resonance occurs, as the resonance frequency.

16. The method of claim 15, wherein the boosting on in (a) is performed by a boosting filter, and
a transfer function of the boosting filter is expressed as $$D_c(z) = \frac{1+K_c}{a+K_cZ^{-1}},$$

wherein $D_c(Z)$ and $K_c$ denote a transfer function and a gain constant, respectively.

17. The method of claim 15, wherein the response signal generated by the voice coil motor actuator comprises a position error signal.

18. A method of compensating for a resonance frequency in a disk drive, comprising:
boosting on a predetermined frequency band of a driving signal input to a voice coil motor actuator so as to excite a head stack assembly;
frequency-transforming a response signal output from the voice coil motor actuator and detecting a resonance frequency in a frequency domain;
separately generating a first excitation signal with the resonance frequency detected, and a second excitation signal with a frequency obtained by subtracting the resonance frequency detected from a sampling frequency for frequency transformation;
boosting of the predetermined frequency band of the driving signal input to the voice coil motor actuator, mixing the driving signal and one of the first excitation signal or the second excitation signal, and inputting a result of mixture to the voice coil motor actuator;
determining whether resonance occurs in a response signal generated by the voice coil motor actuator in response to one of the first excitation signal or the second excitation signal;
determining a frequency of one of the first excitation signal or the second excitation signal input when resonance occurs, as the resonance frequency; and
determining coefficients of a filter that filters the driving signal to remove a frequency component with the resonance frequency determined.

19. The method of claim 18, wherein the boosting on in (a) is performed by a boosting filter, and
a transfer function of the boosting filter is expressed as $$D_c(z) = \frac{1+K_c}{a+K_cZ^{-1}},$$

wherein $D_c(Z)$ and $K_c$ denote a transfer function and a gain constant, respectively.

20. The method of claim 18, wherein the response signal generated by the voice coil motor actuator comprises a position error signal.

21. A resonance frequency minimizing system, comprising:
a controller;
an input signal adaptation unit coupled to receive control signals from the controller; and
a resonance compensating unit coupled to receive, separately, an unboosted signal, a boosted signal and a notch-filtered signal from the input signal adaptation unit and to detect and compensate for a mechanical resonance frequency in the system.

22. The resonance frequency minimizing system of claim 21, wherein the input signal adaptation unit comprises:
a servo controller to input a drive signal;
a switch-filter combination coupled to the servo controller, to output, selectably, an unboosted signal, a boosted signal or a notch-filtered signal in accordance with a first control signal from the controller; and
a filter coefficient generator to determine notch filter coefficients in accordance with a second control signal from the controller.

23. The resonance frequency minimizing system of claim 21, wherein the resonance compensating unit comprises:
an excitation signal generator, to generate and send, separately, to a mixer, a first excitation signal in a first period based on a resonance frequency detected by a resonance frequency detector and a second excitation signal in a second, non-overlapping period based on a subtraction frequency signal;
the mixer, coupled to receive one of:
an unboosted signal, to be mixed separately with a first excitation signal and a second excitation signal to form a first output and a second output to a voice coil motor actuator;
a boosted signal, to be mixed separately with a first excitation signal and a second excitation signal to form a third output and a fourth output to the voice coil motor actuator; or
a notch-filtered signal, wherein, when resonance occurs, the input signal adaptation unit filters the drive signal to remove resonance frequency;
the voice coil motor actuator, to generate a positive error signal;
a resonance determination unit to analyze a magnitude of the positive error signal in a time domain and determine whether a resonance occurs in the positive error signal;
the resonance frequency detector, coupled to receive the positive error signal, to perform frequency transformation of the positive error signal and to detect a resonance frequency in a frequency domain; and
a frequency operation unit, coupled to the resonance determination unit and the resonance frequency detector, to subtract the resonance frequency detected from a predetermined sampling frequency to output the subtraction frequency signal.

24. The resonance frequency minimizing system of claim 23, wherein the controller comprises:
a system controller, coupled to the excitation signal generator, the resonance determination unit and the input signal adaptation unit, to:
boost a drive signal in the input signal adaptation unit;
store and read resonant frequency information for first excitation signal and the second excitation signal and output the read information to the input signal adaptation unit; and
selectably control the input signal adaptation unit to output one of the unboosted signal, the boosted signal, or the notch-filtered signal; and
a memory coupled to the system controller.

25. The resonance frequency minimizing system of, claim 24 wherein the boost of the drive signal includes utilizing a boosting filter having a transfer function that is expressed as $$D_c(z) = \frac{1 + K_c}{a + K_c Z^{-1}},$$

wherein $D_c(Z)$ and $K_c$ denote a transfer function and a gain constant, respectively.

26. A computer-readable medium containing computer-readable instructions of a resonance frequency minimizing method for performing:
implementing a control program that provides control instructions to an input signal adaptation program and a resonance compensating program and that determines whether resonance occurs in the system;
controlling the input signal adaptation program to selectively output an unboosted signal, a boosted signal and a notch-filtered signal; and
controlling a resonance compensating program that, when resonance occurs, provides information to the input signal adaptation program to facilitate generation of notch filter coefficients to remove a mechanical resonance.

27. The computer-readable medium of claim 26, wherein the input signal adaptation program comprises computer-readable instructions to:
input a drive signal;
output, selectably, an unboosted signal, a boosted signal, and a notch-filtered signal in accordance with a first control signal; and
determine notch filter coefficients in accordance with a second control signal.

28. The computer-readable medium of claim 26, wherein the resonance compensating program comprises computer-readable instructions to:
generate separately, a first excitation signal in a first period based on a resonance frequency detected by a resonance frequency detector and a second excitation signal in a second, non-overlapping period based on a subtraction frequency signal;
mix, separately:
an unboosted signal, with a first excitation signal and a second excitation signal to form a first output and a second output;
a boosted signal, with a first excitation signal and a second excitation signal to form a third output and a fourth output;
generate a notch-filtered signal, wherein, when resonance occurs, the input signal adaptation program filters the drive signal to remove resonance frequency;
generate a positive error signal;
analyze a magnitude of the positive error signal in a time domain and determine whether a resonance occurs in the positive error signal;
perform frequency transformation of the positive error signal and detect a resonance frequency in a frequency domain; and subtract the resonance frequency detected from a predetermined sampling frequency to output the subtraction frequency signal.

29. The computer-readable medium of claim 28, wherein control instructions to the input signal adaptation program and the resonance compensating program comprise computer-readable instructions to:
  control boosting the drive signal in the input signal adaptation program; and
  store and read resonant frequency information for the first excitation signal and the second excitation signal and output the read information to the input signal adaptation program.

30. The computer-readable medium of claim 29 wherein the boosting the drive signal includes utilizing a boosting filter having a transfer function that is expressed as $$D_c(z) = \frac{1+K_c}{a+K_c Z^{-1}},$$

wherein $D_c(Z)$ and $K_c$ denote a transfer function and a gain constant, respectively.

* * * * *

UNITED STATES PATENT AND TRADEMARK OFFICE
CERTIFICATE OF CORRECTION

PATENT NO. : 7,031,094 B2
APPLICATION NO. : 10/972562
DATED : April 18, 2006
INVENTOR(S) : Da-woon Chung Page 1 of 1

It is certified that error appears in the above-identified patent and that said Letters Patent is hereby corrected as shown below:

Column 16, lines 5-6, change "of, claim 24" to --of claim 24,--

Column 18, line 1, change "claim 29" to --claim 29.--

Signed and Sealed this

Twenty-sixth Day of September, 2006

JON W. DUDAS
*Director of the United States Patent and Trademark Office*

UNITED STATES PATENT AND TRADEMARK OFFICE
CERTIFICATE OF CORRECTION

PATENT NO.       : 7,031,094 B2  
APPLICATION NO.  : 10/972562  
DATED            : April 18, 2006  
INVENTOR(S)      : Da-woon Chung It is certified that error appears in the above-identified patent and that said Letters Patent is hereby corrected as shown below:

Claim 30, Column 18, line 1, change "claim 29" to --claim 29,--

Signed and Sealed this

Thirteenth Day of March, 2007

JON W. DUDAS  
*Director of the United States Patent and Trademark Office*